US008570556B2

(12) United States Patent
Ohashi

(10) Patent No.: US 8,570,556 B2
(45) Date of Patent: Oct. 29, 2013

(54) IMAGE PROCESSING SYSTEM, DEVICE, AND METHOD HAVING A DATA MANAGEMENT TABLE STORING PRINT JOB SETTING DATA FOR MULTIPLE USERS

(75) Inventor: Yasuo Ohashi, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 872 days.

(21) Appl. No.: 12/362,637

(22) Filed: Jan. 30, 2009

(65) Prior Publication Data
US 2009/0201546 A1 Aug. 13, 2009

(30) Foreign Application Priority Data

Feb. 8, 2008 (JP) .................................. 2008-029547

(51) Int. Cl.
*G06F 3/12* (2006.01)
*G06F 15/16* (2006.01)
*G03G 15/00* (2006.01)

(52) U.S. Cl.
USPC ......... 358/1.15; 358/1.9; 358/1.13; 358/1.14; 358/1.16; 709/203; 399/8

(58) Field of Classification Search
None
See application file for complete search history.

(56) References Cited

U.S. PATENT DOCUMENTS

| 7,075,672 | B2 * | 7/2006 | Onishi et al. | 358/1.15 |
|---|---|---|---|---|
| 7,295,335 | B2 * | 11/2007 | Arakawa | 358/1.15 |
| 7,940,410 | B2 * | 5/2011 | Suzuki | 358/1.15 |
| 8,014,015 | B2 * | 9/2011 | Tokishige | 358/1.15 |
| 2004/0153530 | A1 * | 8/2004 | Machida | 709/220 |
| 2006/0092459 | A1 * | 5/2006 | Kimura et al. | 358/1.15 |
| 2006/0192988 | A1 | 8/2006 | Yamanaka | |
| 2007/0230972 | A1 | 10/2007 | Akashi | |
| 2008/0098303 | A1 | 4/2008 | Murayama | |
| 2008/0137139 | A1 * | 6/2008 | Yamada | 358/1.15 |

FOREIGN PATENT DOCUMENTS

| CN | 1781084 A | 5/2006 |
|---|---|---|
| CN | 101047759 A | 10/2007 |
| JP | 61-272761 | 12/1986 |
| JP | 1-118153 | 5/1989 |
| JP | 1-196077 | 8/1989 |
| JP | 2004-202846 | 7/2004 |
| JP | 2006-74601 A | 3/2006 |
| JP | 2006-74601 A5 | 3/2006 |

(Continued)

OTHER PUBLICATIONS

Office Action issued Oct. 11, 2010 in Chinese Patent Application No. 200910004336.4.

(Continued)

*Primary Examiner* — Steven Kau
(74) *Attorney, Agent, or Firm* — Oblon, Spivak, McClelland, Maier & Neustadt, L.L.P.

(57) ABSTRACT

An image processing system to perform image processing. The image processing system includes an image processing device and a data processing device communicably connected to the image processing device. The data processing device includes a setting screen display unit to display a setting screen to input setting data for the image processing device, and a transfer unit to send the setting data input through the setting screen to the image processing device. The image processing device includes a production unit to create a data management table in which the setting data received from the data processing device and management data for specifying the setting data are associated with each other, a storage unit to store the data management table in a storage medium, and a reading unit to read out the setting data stored in the storage medium based on the data management table.

13 Claims, 13 Drawing Sheets

(56) References Cited

FOREIGN PATENT DOCUMENTS

JP     2007-110617     4/2007
JP     2007-288512     11/2007

OTHER PUBLICATIONS

Office Action issued Oct. 20, 2011 in Japan Application No. 2008-029547.

* cited by examiner

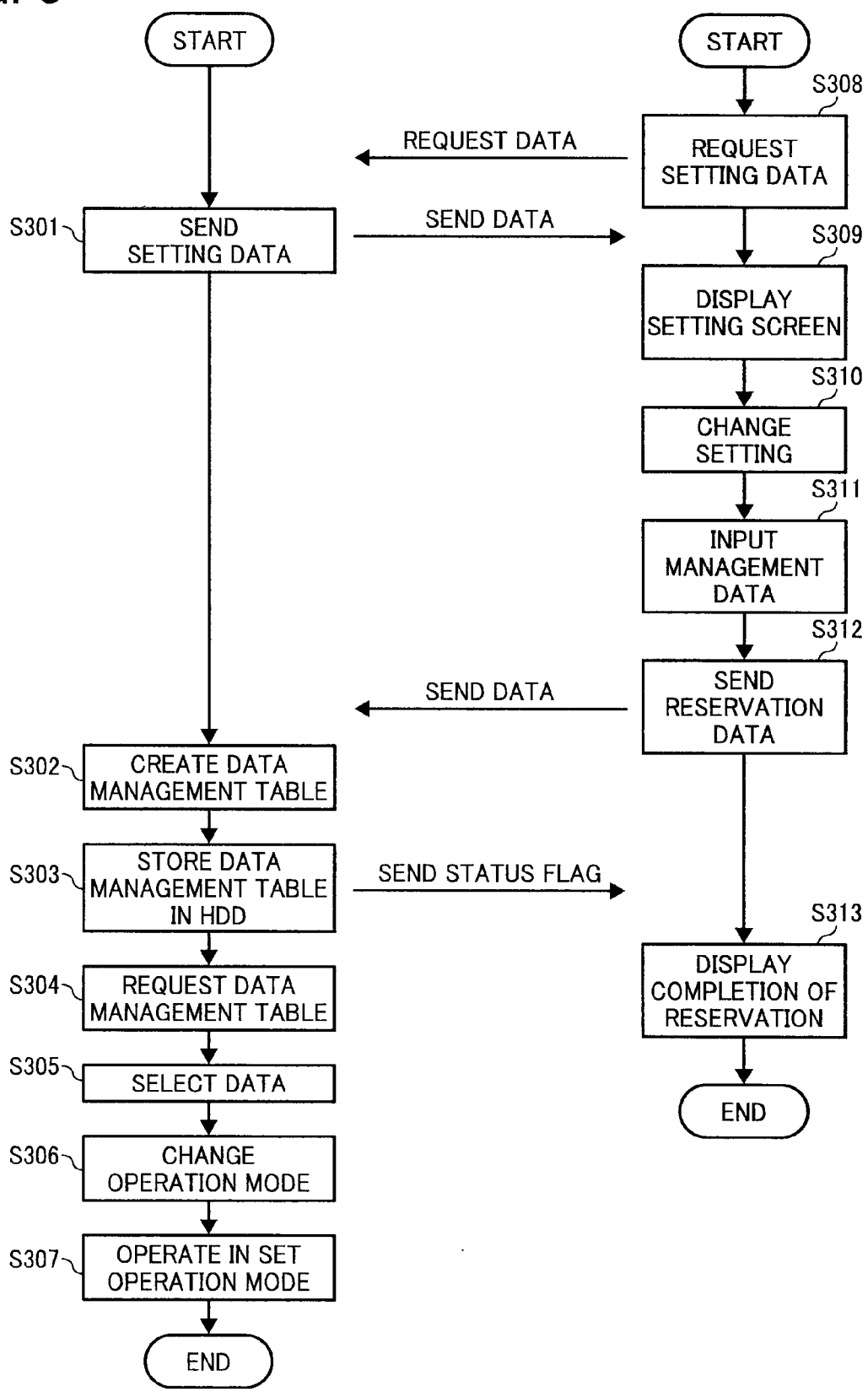

FIG. 5

| MANAGEMENT DATA | SETTING DATA |
| --- | --- |
| 001 | A4T, Color, 1to1, Sort, 10, *** |
| 002 | A3, Mono, 2in1, Non-Sort, 1, *** |
| 003 | A4Y, Mono, 1to1, Sort, 2, Staple, *** |
|  |  |

FIG. 7

| MANAGEMENT DATA | SETTING DATA | SELECT |
|---|---|---|
| 001 | A4T, Color, 1to1, Sort, 10, *** | |
| 002 | A3, Mono, 2in1, Non-Sort, 1, *** | ✓ |
| 003 | A4Y, Mono, 1to1, Sort, 2, Staple, * | |
| | | |
| | | |

LIST OF RESERVATION

CONFIRM

FIG. 9

| MANAGEMENT DATA | SETTING DATA |
|---|---|
| 001 | A4T, Color, 1to1, Sort, 10, *** |
| 002 | A3, Mono, 2in1, Non-Sort, 1, *** |
| 002 | A4Y, Mono, 1to1, Sort, 2, Staple, *** |
| 003 | A4T, Color, 2in1, Non-Sort, 5, *** |

FIG. 12

| MANAGEMENT DATA | SETTING DATA |
|---|---|
| Yamada_001 | A4T, Color, 1to1, Sort, 10, *** |
| Sato_001 | A3, Mono, 2in1, Non-Sort, 1, *** |
| Yamada_002 | A4Y, Mono, 1to1, Sort, 2, Staple, *** |
| Suzuki_001 | A4T, Color, 2in1, Non-Sort, 5, *** |

IMAGE PROCESSING SYSTEM, DEVICE, AND METHOD HAVING A DATA MANAGEMENT TABLE STORING PRINT JOB SETTING DATA FOR MULTIPLE USERS

CROSS-REFERENCE TO RELATED APPLICATIONS

The present patent application is based on and claims priority pursuant to 35 U.S.C. §119 from Japanese Patent Application No. 2008-029547, filed on Feb. 8, 2008 in the Japan Patent Office, the entire contents of which are incorporated herein by reference.

BACKGROUND OF THE INVENTION

1. Field of the Invention

Exemplary aspects of the present invention generally relate to an image processing device (such as a multifunction printer) and a data processing device (such as a personal computer), an image processing system including the image processing device and the data processing device, and an image processing method employed in the image processing system.

2. Description of the Background

Generally, a single data processing device shared by multiple users can only be used by one user at a time. Consequently, a subsequent user who wishes to use the data processing device has to wait until a current user currently using the data processing device finishes. Further, when it is the subsequent user's turn to use the data processing device to print data, that user needs to set print conditions, such as read resolution, print density, and paper size, through, for example, a control panel provided to an image processing device, usually resulting in a longer time to print data.

To solve such an inconvenience, Published Unexamined Japanese Patent Application No. (hereinafter referred to as JP-A-) 2007-110617 discloses an image forming system in which an image forming apparatus is connected to a data processing device capable of displaying an input screen similar to a control panel provided to the image forming apparatus. In such an image forming system, a subsequent user can reserve a next print job to set print conditions for printing data through the input screen displayed on the data processing device while a current user uses the image forming apparatus. When detecting completion of a print job performed by the current user, the image forming apparatus reports detected data to the data processing device. The data processing device displays data notifying the subsequent user of completion of the print job performed by the now-previous user. Thereafter, the data processing device sends the print conditions preset by the subsequent user to the image forming apparatus when the subsequent user presses a send key, so that printing is performed based on the print conditions set by the subsequent user. Accordingly, the time required for printing can be reduced.

However, in the above-described image forming system, because the system needs to confirm completion of the print job performed by the previous user before the print conditions preset by the subsequent user can be sent to the image forming apparatus, the subsequent user has to wait at or near the data processing device even after reserving the print job in order to actually save time. In addition, another user cannot reserve a new print job until the subsequent user sends the print conditions to the image forming apparatus, and further, cannot send new print conditions to the image forming apparatus until the print job performed by the subsequent user is completed. In other words, only one print job at a time can be reserved, and thus the print jobs are performed only as they are reserved.

Therefore, although the above-described image forming system may be effective in an environment in which only one or two users share a single image forming apparatus, such an image forming system is not likely to be effective in an environment such as an office in which many users share a single image forming apparatus.

SUMMARY

In view of the foregoing, illustrative embodiments of the present invention provide an image processing system including an image processing device and a data processing device capable of communicating with the image processing device. In the image processing system, a print job to be performed by the image processing device can be reserved from the data processing device such that a user is not required to operate the data processing device once the print job is reserved. Further, multiple print jobs can be reserved by multiple users through the data processing device, and the print jobs may be performed regardless of the order in which they are reserved, thereby making the image processing system more convenient to use.

In one illustrative embodiment, an image processing system to perform image processing includes an image processing device and a data processing device communicably connected to the image processing device. The data processing device includes a setting screen display unit to display a setting screen to input setting data for the image processing device, and a transfer unit to send the setting data input through the setting screen to the image processing device. The image processing device includes a production unit to create a data management table in which the setting data received from the data processing device and management data for specifying the setting data are associated with each other, a storage unit to store the data management table in a storage medium, and a reading unit to read out the setting data stored in the storage medium based on the data management table.

Another illustrative embodiment provides a method for processing images based on setting data sent from a data processing device communicably connected to an image processing device. The method includes displaying a setting screen to input the setting data for the image processing device, sending the setting data input through the setting screen to the image processing device, creating a data management table in which the setting data and management data for specifying the setting data are associated with each other, storing the data management table in a storage medium, reading out the setting data stored in the storage medium based on the data management table, and processing images based on the setting data.

The data processing device displays the setting screen and sends the setting data, and the image processing device receives the setting data, creates the data management table, stores the data management table, reads out the setting data, and processes the images.

Another illustrative embodiment provides an image processing device to process images based on setting data for the image processing device sent from a data processing device. The image processing device receives the setting data for the image processing device input through a setting screen displayed on the data processing device and includes a production unit to create a data management table, in which the setting data received and management data for specifying the setting data are associated with each other; a storage unit to store the data management table in a storage medium; and a reading unit to read out the setting data stored in the storage medium based on the data management table.

Additional features and advantages of the present invention will be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein:

FIG. 3 is a flowchart illustrating processes performed by an image processing system according to a first illustrative embodiment;

FIG. 5 is a table illustrating a data management table created during the processes illustrated in FIG. 3;

FIG. 7 is a table illustrating a data management table displayed on a control panel provided to the multifunction printer during the processes illustrated in FIG. 6;

FIG. 9 is a table illustrating a data management table displayed on the control panel provided to the multifunction printer in the image processing system according to the third illustrative embodiment when duplicated data is present;

FIG. 12 is a table illustrating a data management table displayed on the control panel provided to the multifunction printer in the image processing system according to the fifth illustrative embodiment.

DETAILED DESCRIPTION OF ILLUSTRATIVE EMBODIMENTS

Figure 1:
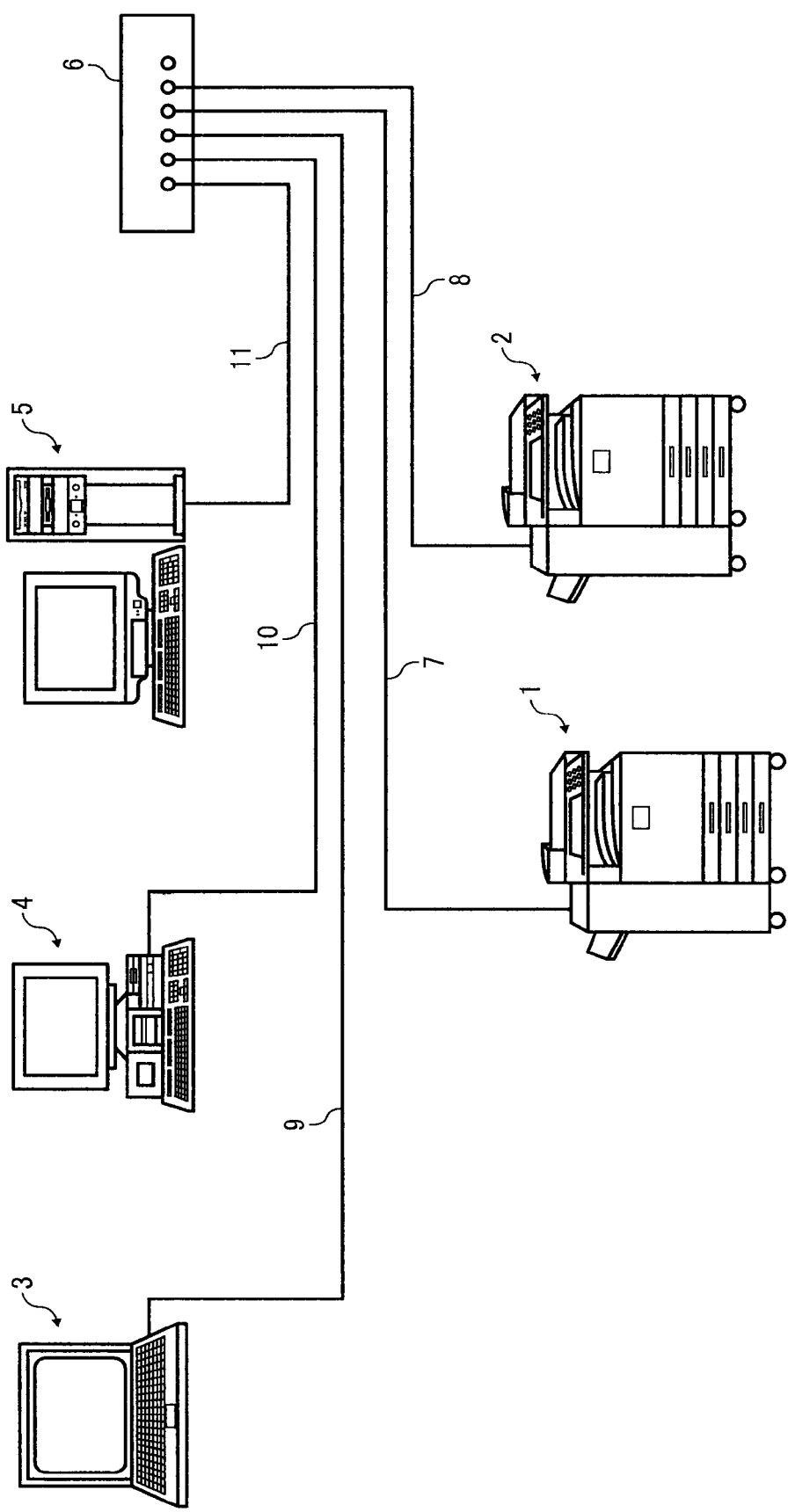
FIG. 1 is a schematic view illustrating an example of an overall configuration of an image processing system according to illustrative embodiments.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

FIG. 1 is a schematic view illustrating an example of an overall configuration of an image processing system having a smaller configuration according to illustrative embodiments.

The image processing system includes multifunction printers 1 and 2 (hereinafter collectively referred to as multifunction printers) each serving as an image processing device, and personal computers 3 to 5 (hereinafter collectively referred to as PCs) each serving as a data processing device. Network cables 7 to 11 connect the multifunction printers and the PCs via a hub 6.

Data communication between the PC 3 and the multifunction printer 1 is performed through the network cable 9 connected to the PC 3, the hub 6, and the network cable 7 connected to the multifunction printer 1. Data communication between the PC 3 and the multifunction printer 2 is performed through the network cable 9, the hub 6, and the network cable 8 connected to the multifunction printer 2. Similarly, data communication between the PCs 4 and 5 and the multifunction printers 1 and 2 is performed through the network cables 10 and 11, the hub 6, and the network cables 7 and 8, respectively.

Figure 2:
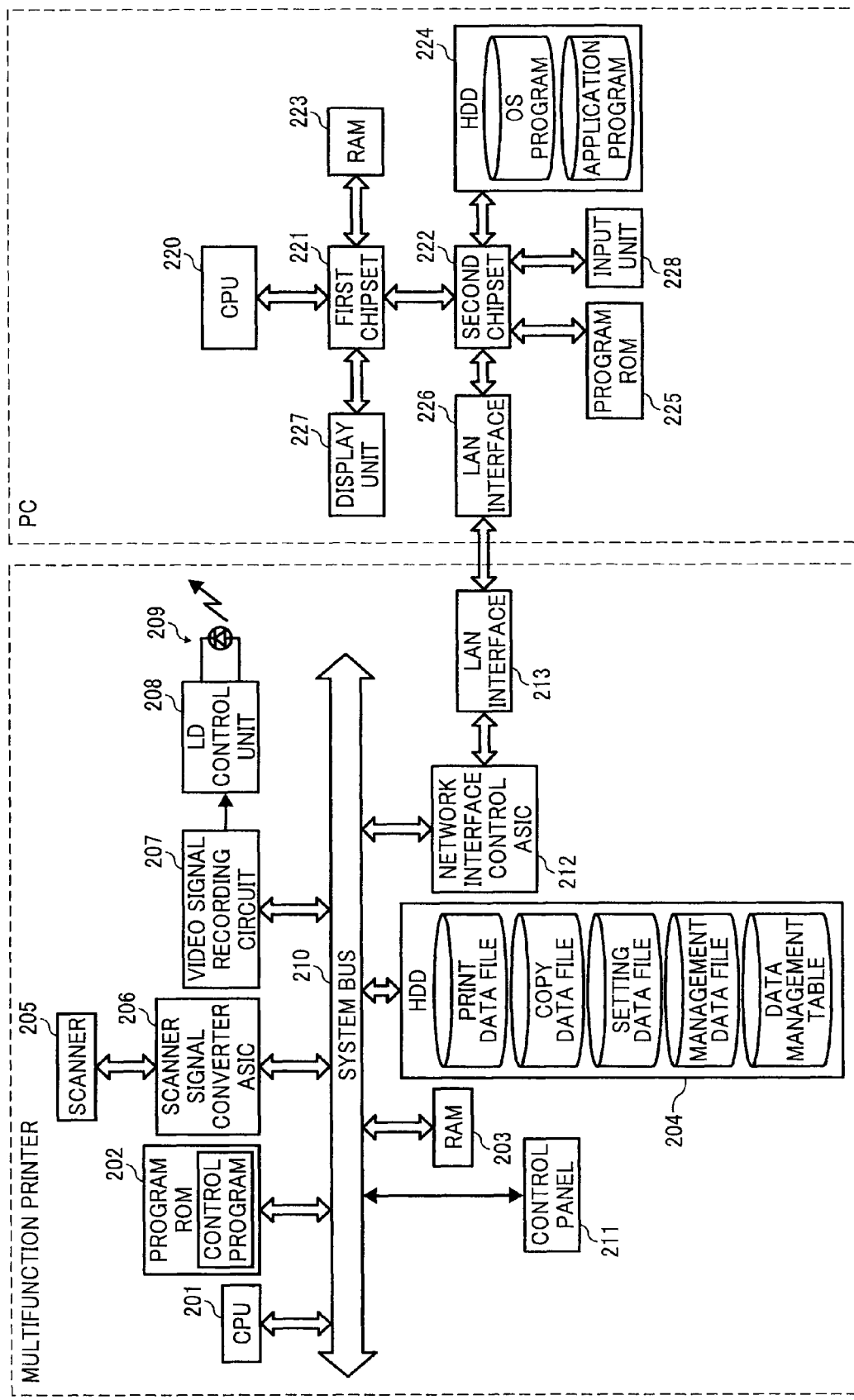
FIG. 2 is a schematic view illustrating an inner configuration of a control board of the image processing system in which a multifunction printer and a PC are connected to each other through respective interfaces.

FIG. 2 is a schematic view illustrating an inner configuration of a control board of the image processing system, in which the multifunction printer and the PC illustrated in FIG. 1 are connected to each other through respective interfaces.

The multifunction printer includes a central processing unit (CPU) 201, a program read-only memory (ROM) 202, a random access memory (RAM) 203, a hard disk drive (HDD) 204, a scanner signal converter application specific integrated circuit (ASIC) 206, a video signal recording circuit 207, a control panel 211, and a network interface control ASIC 212. Each of the above-described components is connected to a system bus 210 included in the multifunction printer. The multifunction printer further includes a scanner 205 connected to the scanner signal converter ASIC 206, a laser diode (LD) control unit 208 connected to the video signal recording circuit 207, an LD 209 controlled by the LD control unit 208, and a local area network (LAN) interface 213 connected to the network interface control ASIC 212.

The PC includes a CPU 220, a first chipset 221, a second chipset 222, a RAM 223, an HDD 224, a program ROM 225, a LAN interface 226, a display unit 227, and an input unit 228. The CPU 220, the RAM 223, and the display unit 227 are connected to the first chipset 221, respectively. The HDD 224, the program ROM 225, the LAN interface 226, and the input unit 228 are connected to the second chipset 222, respectively. The first and second chipsets 221 and 222 are connected to each other.

The multifunction printer is controlled by the CPU 201. The CPU 201 reads out a control program or the like from the program ROM 202 to start the control program. Data necessary for operations of the multifunction printer and image data are temporarily stored in the RAM 203 and accessed by the CPU 201.

During printing, the scanner 205 reads image data of a document. The image data thus read is corrected by the scanner signal converter ASIC 206, and written on the RAM 203.

The image data is temporarily stored in the HDD 204 as well as the RAM 203 in a case of printing multiple copies.

In addition to copy data (a copy data file), print data for a printer (a print data file) sent from the PC is stored in the HDD 204. The HDD 204 is also used for storing setting data (a setting data file) including various settings settable through the control panel 211, management data (a management data file) for specifying the settings, and a data management table for associating the setting data with the management data.

When an image is copied or printed, image data stored in the RAM 203 is sent to the LD control unit 208 through the video signal recording circuit 207. Thereafter, a latent image is formed on a photoconductor, not shown, by light emitted from the LD 209, and a series of processes such as transfer and fixing of a toner image onto a sheet is performed to form the image on the sheet. Because those processes are known technologies, descriptions thereof are omitted.

The PC is controlled by the CPU 220. The CPU 220 reads out a basic input/output system (BIOS) program from the program ROM 225 to start the BIOS program. The BIOS program is used for controlling the display unit 227, the input unit 228, and so forth. An operating system (OS) program and one or more application programs are stored in the HDD 224, and read and started by the CPU 220. Data necessary for operations of the PC is temporarily stored in the RAM 223, and accessed by the CPU 220. The CPU 220 accesses various input/output (I/O) units via the first and second chipsets 221 and 222. The LAN interface 226 serving as an interface with the multifunction printer is connected to the CPU 220 via the first and second chipsets 221 and 222.

The multifunction printer and the PC are connected to each other by the LAN interfaces 213 and 226 respectively provided in the multifunction printer and the PC, and communication therebetween is performed using network protocols such as TCP/IP (transmission control protocol/internet protocol), and a user datagram protocol (UDP). Alternatively, dedicated lines, other types of protocols, or wireless interfaces may be used to effect communication between the multifunction printer and the PC. Because the above-described protocols and interfaces are well known, descriptions thereof are omitted.

Figure 4A:
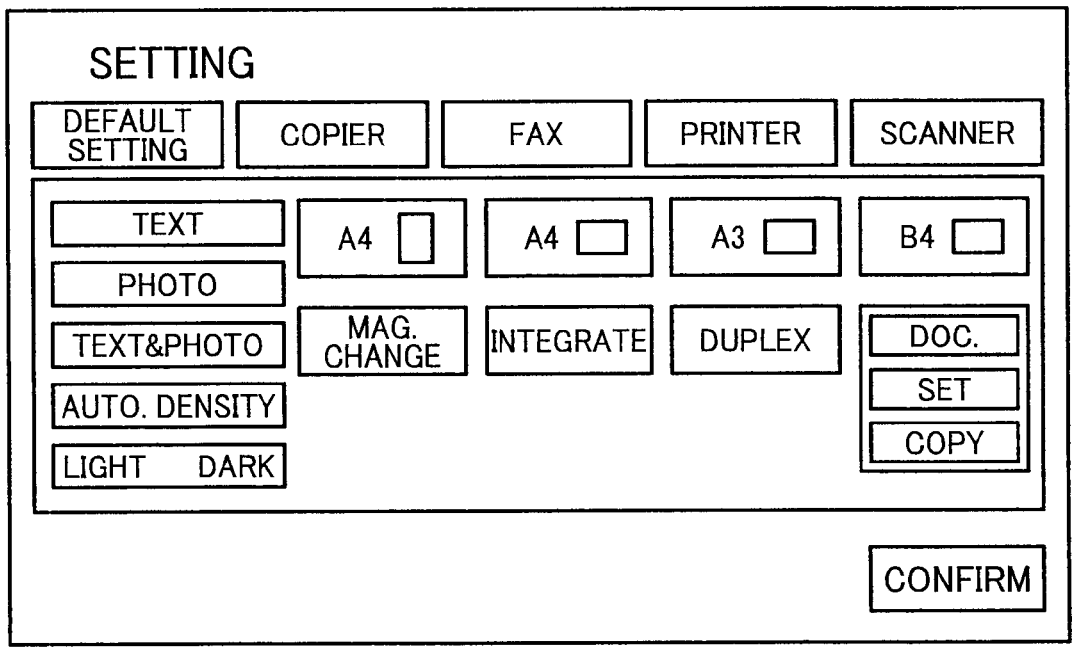
FIGS. 4A and 4B are views illustrating examples of a setting screen displayed on the PC during the processes illustrated in FIG. 3.
Figure 4B:
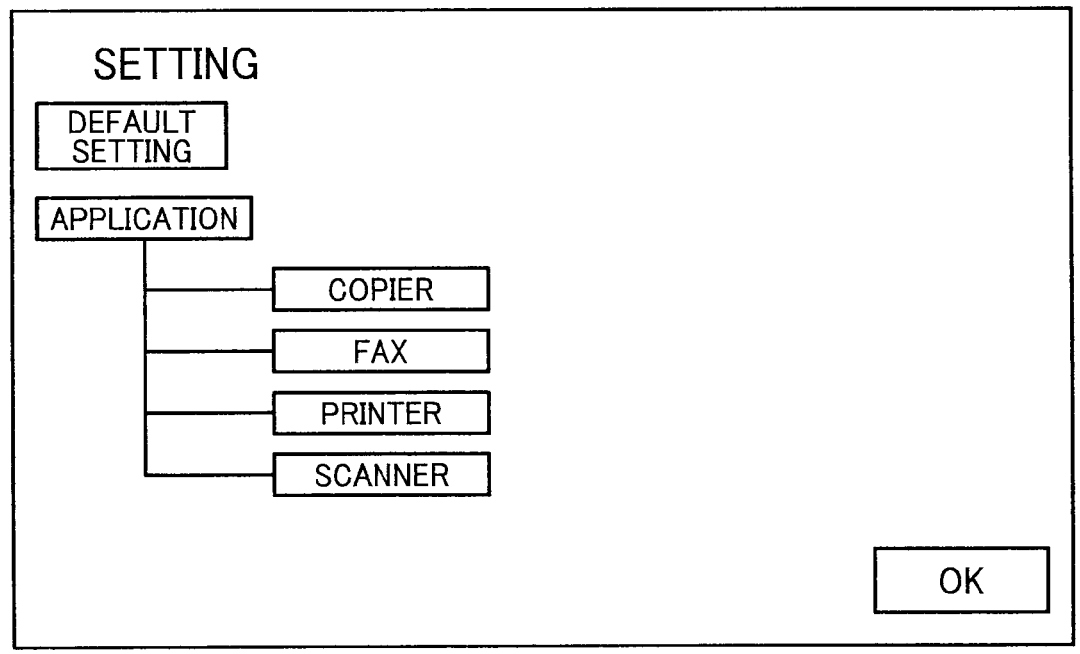

A description is now given of reservation of setting data from the PC and image processing performed by the multifunction printer based on the setting data using FIGS. 3 through 5. FIG. 3 is a flowchart illustrating processes of processing images performed by an image processing system according to a first illustrative embodiment. FIGS. 4A and 4B are views illustrating examples of a setting screen displayed on the PC during image processing. FIG. 5 is a table illustrating a data management table created during image processing.

When the user reserves a print job to be performed by the multifunction printer from the PC, at S308 the CPU 220 of the PC sends a request to the CPU 201 of the multifunction printer via the LAN interfaces 226 and 213 for data on print conditions settable through the control panel 211 of the multifunction printer, based on a setting request input from the input unit 228 of the PC. The data on print conditions (hereinafter referred to as setting data) includes data on sheet size, installation states of peripheral devices, read resolution, file conversion format, and so forth.

At S301, the CPU 201 sends the setting data to the CPU 220 via the LAN interfaces 213 and 226 in response to the setting request from the PC. At S309, the CPU 220 displays the setting screen as illustrated in FIG. 4A or 4B on the display unit 227 based on the setting data sent from the multifunction printer.

It should be noted that the setting screens illustrated in FIGS. 4A and 4B are displayed on the control panel 211 included in multifunction printers of different types, respectively. Here, for example, when receiving the setting data from the multifunction printer 1 illustrated in FIG. 1, the PC displays the setting screen illustrated in FIG. 4A on the display unit 227. By contrast, when receiving the setting data from the multifunction printer 2 illustrated in FIG. 1, the PC displays the setting screen illustrated in FIG. 4B on the display unit 227. Alternatively, a setting screen having the same display format including the same screen position and characters may be displayed on the display unit 227 regardless of the types of the multifunction printers.

Specifically, in a case in which names of setting items, coordinates of buttons, setting items in a tree structure, and so forth in the setting screen are displayed differently on the control panel 211 among the multifunction printers of the different types, even the same setting item may be displayed in a different position on the display unit 227 depending on the types of the multifunction printers when the setting item displayed on the control panel 211 is displayed as it is on the display unit 227. Consequently, the user is required to get used to the setting screen displayed on each type of the multifunction printers. To solve such an inconvenience, a function of arbitrarily changing the display format of the setting screen based on the setting data acquired by the management information base (MIB) is provided to the PC. As a result, the setting data can be displayed on the setting screen having the same display format regardless of the types of the multifunction printers, thereby improving convenience for the user.

Because data communication between the PC and the multifunction printer to be described below is also performed through the LAN interfaces 226 and 213 as described above, detailed descriptions thereof are omitted.

At S310, the user selects setting items to be changed through the setting screen displayed on the display unit 227 using the input unit 228. Subsequently, at S311, the user inputs management data through the input unit 228. The management data is associated with the setting data to specify the setting data. When setting is completed, at S312, the PC sends reservation data including the setting data and the corresponding management data to the multifunction printer.

When receiving the reservation data, at S302, the multifunction printer writes the setting data and the management data associated with the setting data in the data management table to create a data management table like that illustrated in FIG. 5. Thereafter, at S303, the multifunction printer stores the data management table in the HDD 204, and sends a status flag indicating completion of data management table storage in the HDD 204 to the PC. At S313, the PC displays data indicating completion of data management table storage on the display unit 227 to notify the user.

At S304, when the user requests the data management table through the control panel 211 of the multifunction printer, a list of the management data is displayed on the control panel 211 such that the user can select desired setting data. At S305, when the user selects the desired setting data from the list of the management data, at S306 the setting data thus selected is set to the RAM 203 to change an operation mode of the multifunction printer in accordance with the setting data. At S307, the multifunction printer starts image processing in the operation mode thus set.

It should be noted that the term "image processing" as used in this specification includes image formation on the sheet based on image data of a document read by the scanner 205, transmittal of the image data to the PC, storing the image data in the HDD 204 or a storage unit connectable to the multifunction printer, printing an image on the sheet based on the image data sent from the PC, and so forth.

As described above, in the image processing system according to the first illustrative embodiment, the data management table including the setting data and the management data associated with the setting data is stored in the HDD 204 and displayed on the control panel 211 of the multifunction printer. The operation mode of the multifunction printer can be changed based on the setting data selected from the data management table so that image processing is performed in accordance with the setting data. Further, because the management data created by the user is used, the user can easily recall the management data, thereby improving convenience.

A description is now given of an image processing system according to a second illustrative embodiment. It should be noted that the overall configuration of the image processing system according to the following illustrative embodiments and the inner configuration of the control board of the image processing system according to the following illustrative embodiments are the same as those illustrated in FIGS. 1 and 2, respectively. Further, the processes from reservation of the setting data to image processing based on the setting data is the same as that according to the first illustrative embodiment illustrated in FIG. 3.

Figure 6:
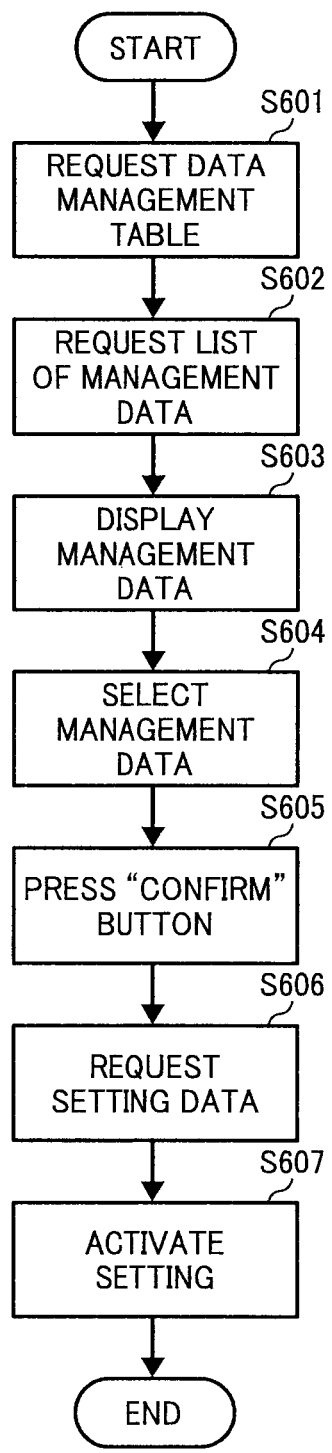
FIG. 6 is a flowchart illustrating processes performed by the multifunction printer in an image processing system according to a second illustrative embodiment.

FIG. 6 is a flowchart illustrating processes from selection of the setting data from the data management table stored in the HDD 204 to setting of the setting data thus selected to the multifunction printer. Those processes correspond to the processes from S304 to S306 in the flowchart illustrated in FIG. 3. FIG. 7 is a table illustrating a data management table displayed on the control panel 211 provided to the multifunction printer during the processes illustrated in FIG. 6.

The list of the management data is requested through the control panel 211. At S601, the multifunction printer reads out the data management table from the HDD 204. Subsequently, at S602, the list of the management data stored in the management data file in the HDD 204 is requested through the control panel 211. At S603, the list of the management data thus requested is displayed together with the setting data, simplified for display, on the control panel 211 as illustrated in FIG. 7 so that the user can easily confirm the management data.

At S604, the user selects desired management data from the list of the management data displayed on the control panel 211, and presses a confirmation button at S605. Here, it is assumed that management data "002" in FIG. 7 is selected. Subsequently, at S606, the management data thus selected and the setting data in the data management table are requested. At S607, the management data and the setting data are written in the RAM 203 to activate the setting.

Figure 8:
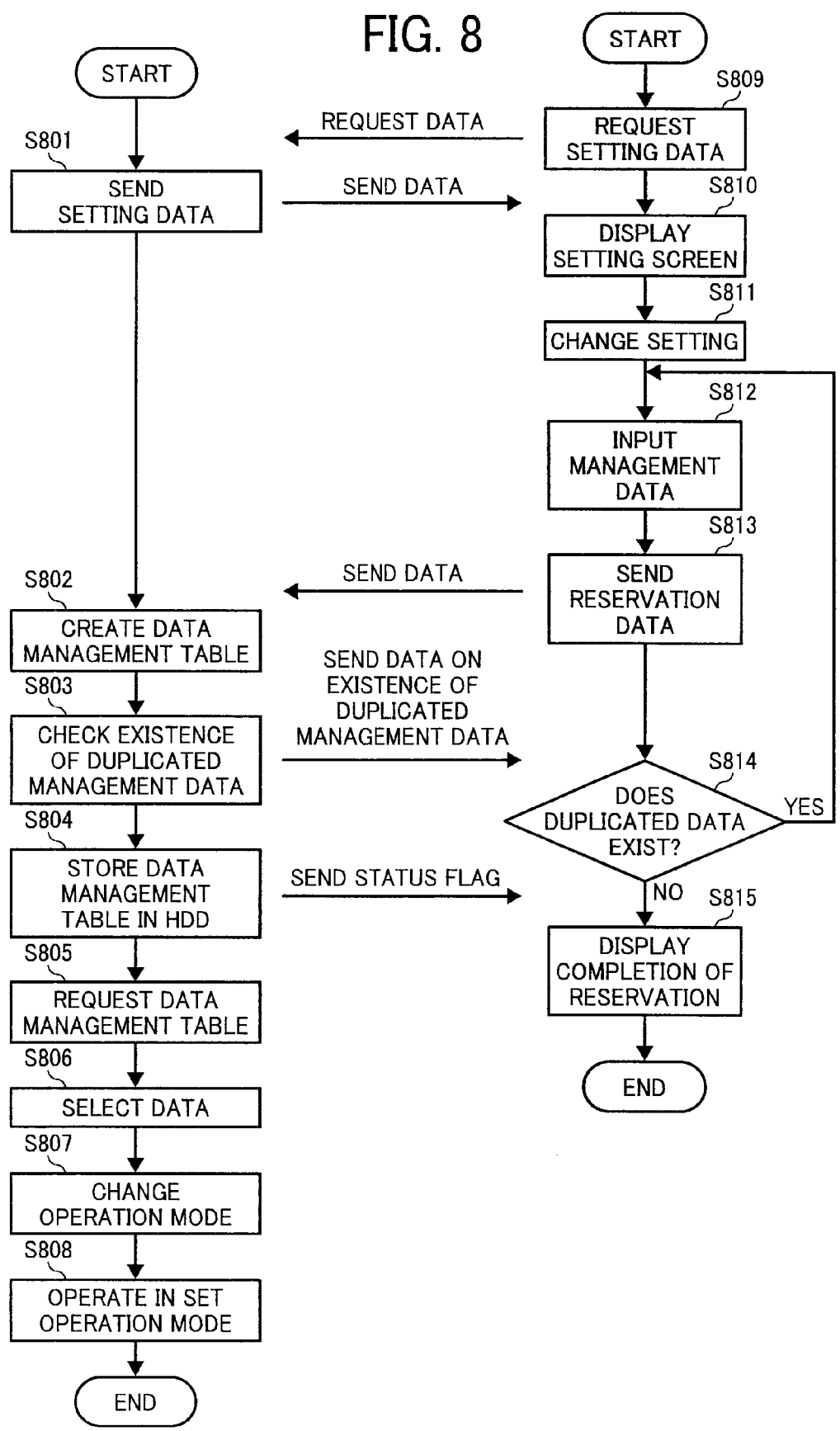
FIG. 8 is a flowchart illustrating processes performed by an image processing system according to a third illustrative embodiment.

A description is now given of an image processing system according to a third illustrative embodiment. FIG. 8 is a flowchart illustrating processes performed by the image processing system according to the third illustrative embodiment.

Processes of S801 and S802, and from S804 to S808 performed by the multifunction printer in FIG. 8 are the same as the processes from S301 to S307 in FIG. 3. In addition, processes from S809 to S813 and S815 performed by the PC in FIG. 8 are the same as the processes from S308 to S313 in FIG. 3.

According to the third illustrative embodiment, at S803, the multifunction printer checks duplication of the management data in the data management table, and sends data indicating whether or not duplicated management data is present in the data management table to the PC. When duplicated management data is present in the data management table (YES at S814), the process returns to S812 to input the management data again.

FIG. 9 is a table illustrating the data management table displayed on the control panel 211 when duplicated data is present. Here, because two management data "002" are present in the data management table, the multifunction printer reports duplication of the management data "002" to the PC. At S812, the user modifies the management data through the setting screen of the PC, and completes setting. Thereafter, at S813, the PC sends the reservation data including the setting data and the management data thus modified to the multifunction printer.

Therefore, according to the third illustrative embodiment, in addition to the fact that the management data created by the user can be used, an owner of the setting data can be specified even when the management data is duplicated. Because the multifunction printer checks duplication of the management data in the data management table and the user is prompted to modify the management data when the management data is duplicated, the multifunction printer can reliably specify which setting data is set by which user even when multiple setting data are sent from multiple users. When the management data is modified by the user to create unduplicated management data such as management data "001" and "003" in the data management table illustrated in FIG. 9, the setting data associated with the management data can be specified.

Figure 10:
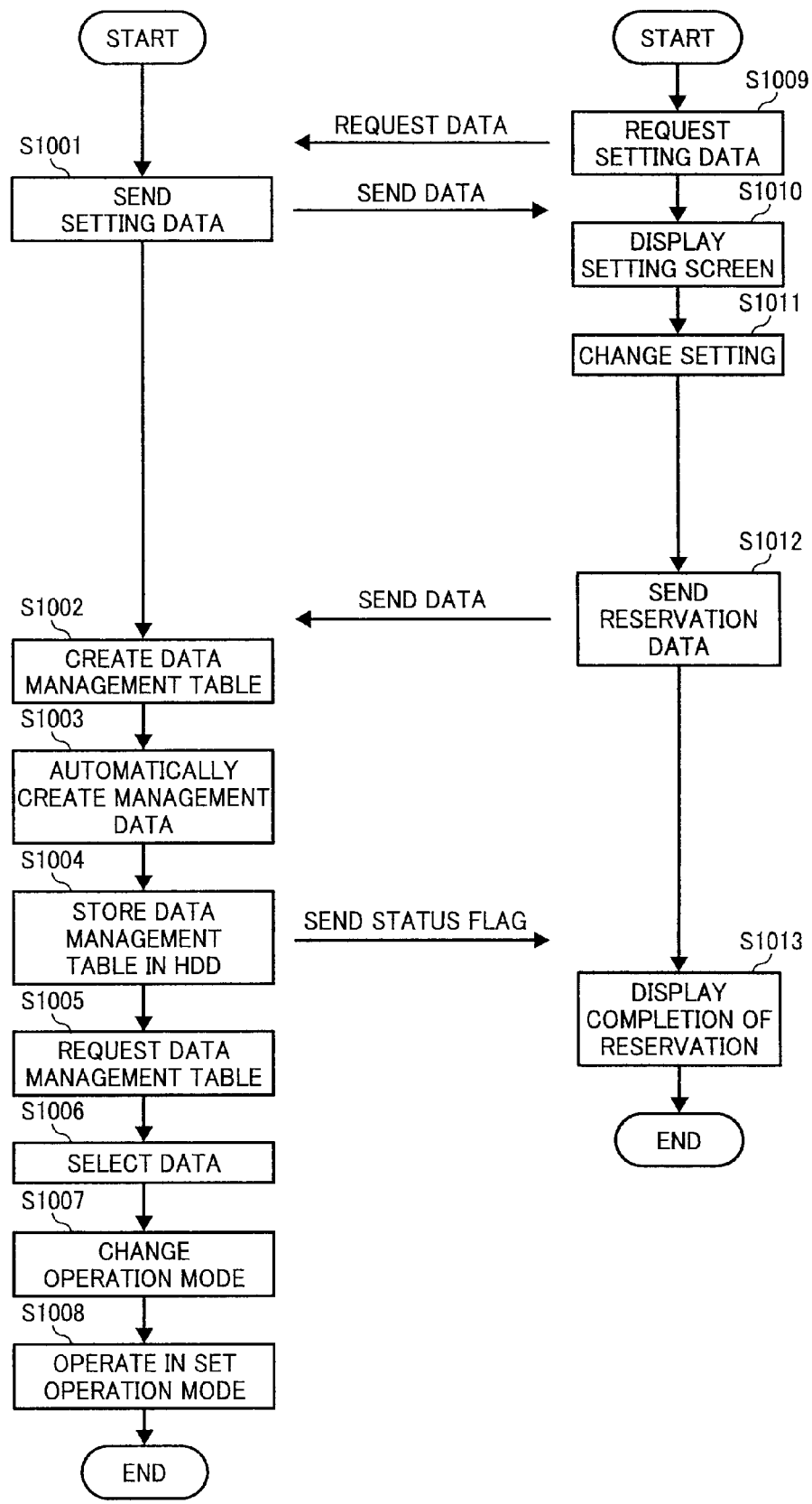
FIG. 10 is a flowchart illustrating processes performed by an image processing system according to a fourth illustrative embodiment.

A description is now given of an image processing system according to a fourth illustrative embodiment. FIG. 10 is a flowchart illustrating processes performed by the image processing system according to the fourth illustrative embodiment.

Processes of S1001 and S1002, and from S1004 to S1008 performed by the multifunction printer are the same as the processes from S301 to S307 illustrated in FIG. 3. In addition, processes from S1009 to S1011 and S1013 performed by the PC are the same as the processes from S308 to S310 and S313 illustrated in FIG. 3.

According to the fourth illustrative embodiment, at S1003, the multifunction printer automatically creates an unduplicated management number as the management data. Accordingly, the management data is not required to be input by the user through the PC. As a result, at S1012, only the setting data is sent as the reservation data from the PC to the multifunction printer. When receiving the reservation data, the multifunction printer automatically creates the unduplicated management data.

For example, referring back to FIG. 1, when multiple users send setting data to the same multifunction printer from the PCs of each of the users via the network, the setting data are stored in the HDD 204 of the multifunction printer together with the management data. In such a case, the multifunction printer automatically creates the management data including unduplicated data or serial numbers such as "data 001", "data 002", "data 003", "yamada_001", "yamamoto_001", and "yamada_002". As a result, duplication of the management data in the data management table can be prevented, thereby improving convenience to the users.

Figure 11:
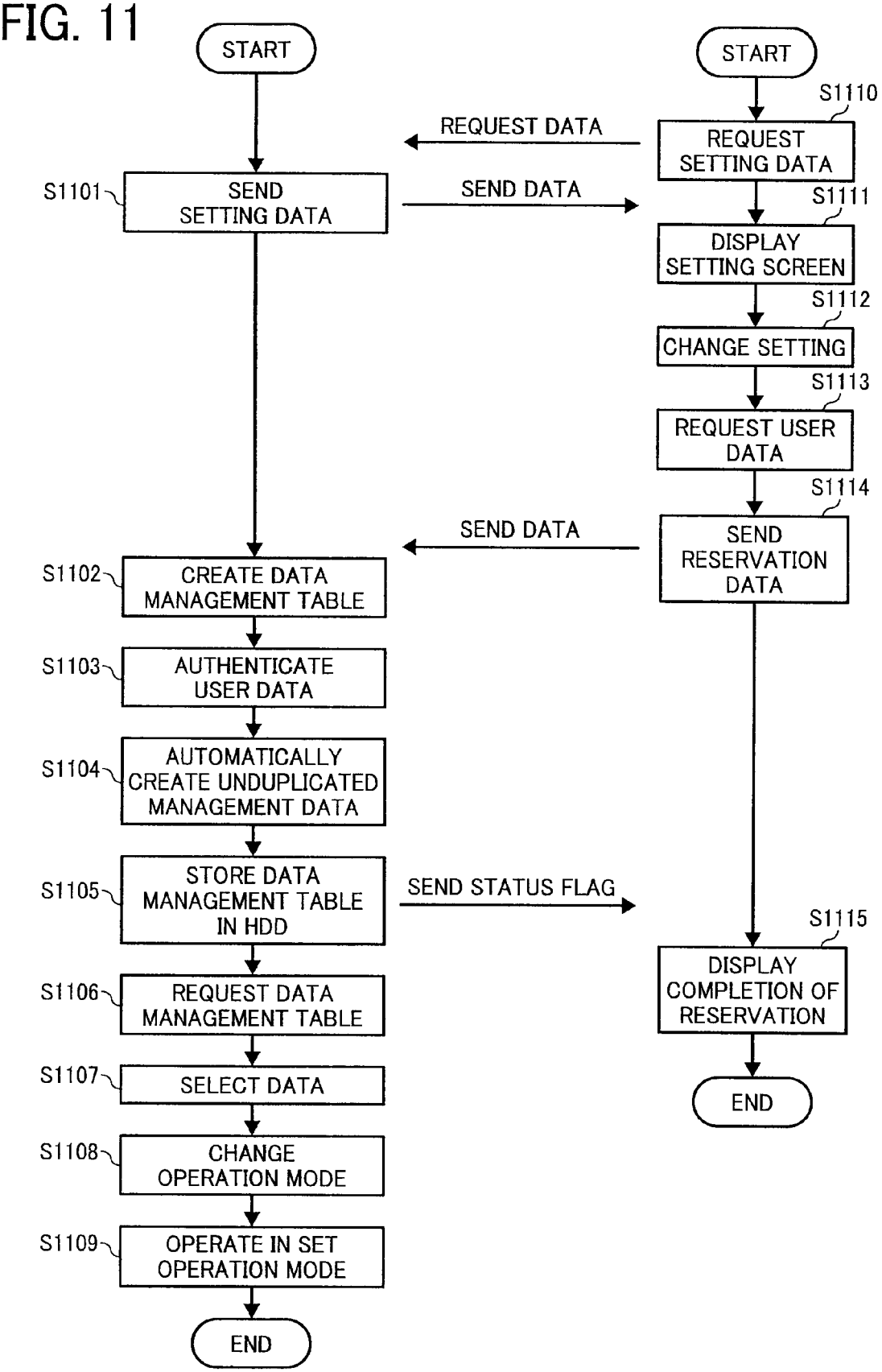
FIG. 11 is a flowchart illustrating processes performed by an image processing system according to a fifth illustrative embodiment.

A description is now given of an image processing system according to a fifth illustrative embodiment. FIG. 11 is a flowchart illustrating processes performed by the image processing system according to the fifth illustrative embodiment.

Processes from S1101 and S1102, and from S1105 to S1109 performed by the multifunction printer are the same as the processes from S301 to S307 illustrated in FIG. 3. In addition, processes from S1110 to S1112 and S1115 performed by the PC are the same as the processes from S308 to S310 and S313 illustrated in FIG. 3.

According to the fifth illustrative embodiment, at S1113, the PC acquires user data such as ID input from a card reader, a fingerprint authentication device, or the like connected to the input unit 228, or requires user data prestored in the RAM 223 or the HDD 224. Subsequently, at S1114, the user data is sent together with the setting data as the reservation data to the multifunction printer.

At S1102, the multifunction printer creates a data management table as illustrated in FIG. 12 based on the reservation data thus received. At S1103, the multifunction printer compares the user data received from the PC with ID data manually input from the control panel 221 or a card reader or a fingerprint authentication device connected to the control panel 211. When the user data matches the ID data, at S1104, the multifunction printer automatically creates unduplicated management data. For example, when there are two sets of reservation data both including the same last name "Yamada", the multifunction printer assigns different numbers to each set of the reservation data, such as "Yamada_001" and "Yamada_002". By contrast, when the user data does not match the ID data, the multifunction printer may report nonexistence of duplicated management data to the PC.

Accordingly, even in an office environment in which multiple PCs are connected to a specific multifunction printer via a network, authentication data of the users such as a user ID and a password are registered in advance in the multifunction printer so that the user who reserves the setting data from the PC can be reliably specified by user authentication. Specifically, duplication of the management data can be prevented even without having a function of checking duplication of the management data.

It should be noted that the user data may be registered in advance in the multifunction printer as described above. Alternatively, an authentication server may be independently built and connected to the network to be used by multiple multifunction printers.

Figure 13:
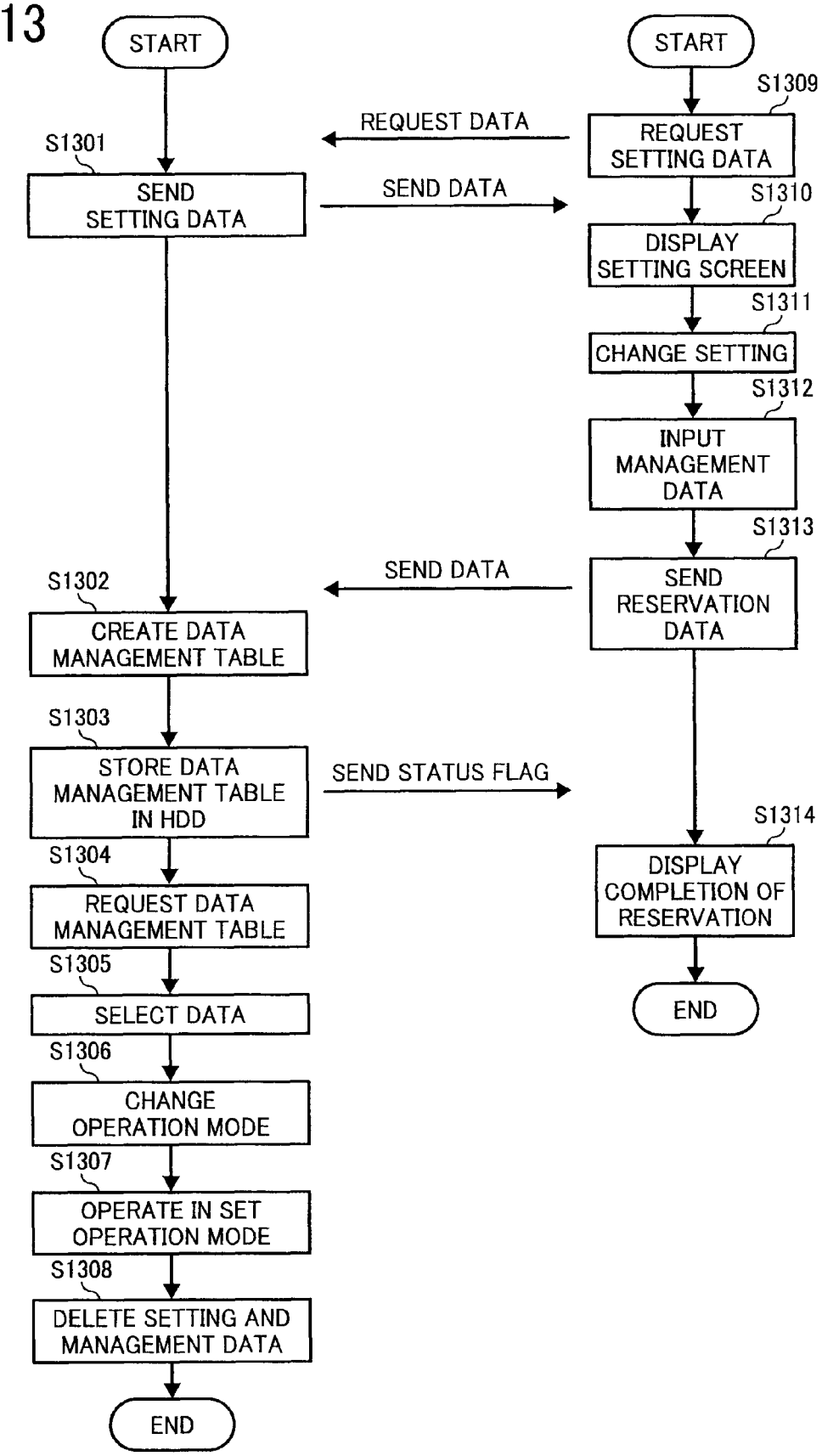
FIG. 13 is a flowchart illustrating processes performed by an image processing system according to a sixth illustrative embodiment.

A description is now given of an image processing system according to a sixth illustrative embodiment. FIG. 13 is a flowchart illustrating processes performed by the image processing system according to the sixth illustrative embodiment.

Processes from S1301 to S1307 performed by the multifunction printer illustrated in FIG. 13 are the same as the processes from S301 to S307 illustrated in FIG. 3. In addition, processes from S1309 to S1314 performed by the PC illustrated in FIG. 13 are the same as the processes from S308 to S313 illustrated in FIG. 3.

According to the sixth illustrative embodiment, at S1307, the multifunction printer performs image processing based on the setting data. Thereafter, at S1308, the multifunction printer deletes the setting data and the management data associated with the setting data from the HDD 204. The rest of the processes according to the sixth illustrative embodiment are the same as those according to the first illustrative embodiment.

According to the above-described sixth illustrative embodiment, in a case in which the setting data is sent from the PC to the multifunction printer each time the user reserves the setting data, the setting data is deleted from the HDD 204 at completion of image processing such as output of printed images and transfer of scanned data to the PC, thereby preventing unnecessary storage of unneeded data in HDD 204 and thus saving system resources.

However, setting data frequently used by the user and management data associated with the setting data may be stored in the HDD 204 so that the setting data may be read through the control panel 211 without sending the setting data from the PC to the multifunction printer each time the user reserves the setting data, again conserving system resources.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. An image processing system to perform image processing, comprising:
   a data processing device; and
   an image processing device,
   the data processing device and the image processing device communicably connected to each other, the data processing device requesting, from the image processing device, options that are settable through a control panel of the image processing device;
   the data processing device comprising:
      a setting screen display unit to display a setting screen to input setting data for the image processing device, the setting data specifying at least one print condition for processing and printing data at the image processing device, the setting screen including each of the settable options that are settable through the control panel of the image processing device, the settable options being received from the image processing device; and
      a transfer unit to send the setting data input through the setting screen to the image processing device,
   the image processing device comprising:
      a production unit to create a data management table in which the setting data received from the data processing device and management data for specifying the setting data are associated with each other;
      a storage unit to store the data management table in a storage medium;
      a display unit to display a list of the management data on the control panel based on the data management table, the list being created based on the setting data input through the setting screen; and
      a reading unit to read out the setting data stored in the storage medium based on the data management table prior to processing and printing the data, wherein
      the reading unit reads out setting data associated with the management data selected from the list through the control panel.

2. The image processing system according to claim 1, wherein
   the management data is input through an input screen displayed on the data processing device and is sent together with the setting data to the image processing device, and the image processing device further comprises:

a confirmation unit to confirm whether or not duplicated management data is present in the data management table; and a transfer unit to send data indicating that duplicated management data is present in the data management table to the data processing device from which the management data is sent.

3. The image processing system according to claim 1, wherein the management data is automatically created when the image processing device receives the setting data.

4. The image processing system according to claim 1, wherein the data processing device sends user authentication data for specifying the data processing device or a user together with the setting data to the image processing device, and the image processing device automatically creates the management data based on the user authentication data.

5. The image processing system according to claim 1, wherein the image processing device further comprises a deleting unit to delete the setting data and the management data associated with the setting data from the storage medium after the image processing is performed based on the setting data.

6. The image processing system according to claim 1, wherein the setting screen display unit displays the setting screen based on original data of the setting data sent from the image processing device.

7. The image processing system according to claim 6, wherein the data processing device further comprises a display format adjustment unit to provide a display format of the setting screen that is different from a display format of the control panel of the image processing device from which the original data of the setting data is sent.

8. A method for processing images based on setting data sent from a data processing device communicably connected to an image processing device, the method comprising:

requesting options that are settable through a control panel of the image processing device, the settable options being requested from the image processing device;

receiving the settable options from the image processing device;

displaying a setting screen to input the setting data for the image processing device, the setting data specifying at least one print condition for processing and printing images at the image processing device, the setting screen including each of the settable options that are settable through the control panel of the image processing device;

sending the setting data input through the setting screen to the image processing device;

creating a data management table in which the setting data and management data for specifying the setting data are associated with each other;

storing the data management table in a storage medium;

displaying a list of the management data on the control panel based on the data management table, the list being created based on the setting data input through the setting screen;

reading out setting data stored in the storage medium and associated with the management data selected from the list through the control panel prior to processing and printing the images; and processing the images based on the setting data, wherein the data processing device performs the requesting, the receiving, the displaying of the setting screen and the sending of the setting data, and the image processing device performs the creating of the data management table, the storing of the data management table, the displaying of the list, the reading out of the setting data, and the processing of the images.

9. An image processing device to process images based on setting data for the image processing device sent from a data processing device, the image processing device comprising:

a transmitting unit to send options that are settable through a control panel of the image processing device, in response to a request from the data processing device, so as to display, at the data processing device, a setting screen to input setting data, the setting data specifying at least one print condition for processing and printing data at the image processing device, the setting screen including each of the settable options that are settable through the control panel of the image processing device;

a production unit to create a data management table in which the setting data and management data for specifying the setting data are associated with each other, the setting data specifying at least one print condition for processing and printing data at the image processing device;

a storage unit to store the data management table in a storage medium;

a display unit to display a list of the management data on the control panel based on the data management table, the list being created based on the setting data input through the setting screen; and a reading unit to read out the setting data stored in the storage medium based on the data management table prior to processing and printing the data, wherein the reading unit reads out setting data associated with the management data selected from the list through the control panel.

10. The image processing system according to claim 1, wherein the at least one print condition specifies one or more of a paper size, installation states of peripheral devices, a read resolution, and a file conversion format.

11. The method according to claim 8, wherein the at least one print condition specifies one or more of a paper size, installation states of peripheral devices, a read resolution, and a file conversion format.

12. The image processing device according to claim 9, wherein the at least one print condition specifies one or more of a paper size, installation states of peripheral devices, a read resolution, and a file conversion format.

13. The image processing system according to claim 1, wherein the settable options and the setting screen differ based on a type of the image processing device.

* * * * *